Nov. 26, 1940.  E. E. GIESEN  2,222,766
AUTOMATIC CHANGE SPEED TRANSMISSION
Filed April 27, 1938  4 Sheets-Sheet 1
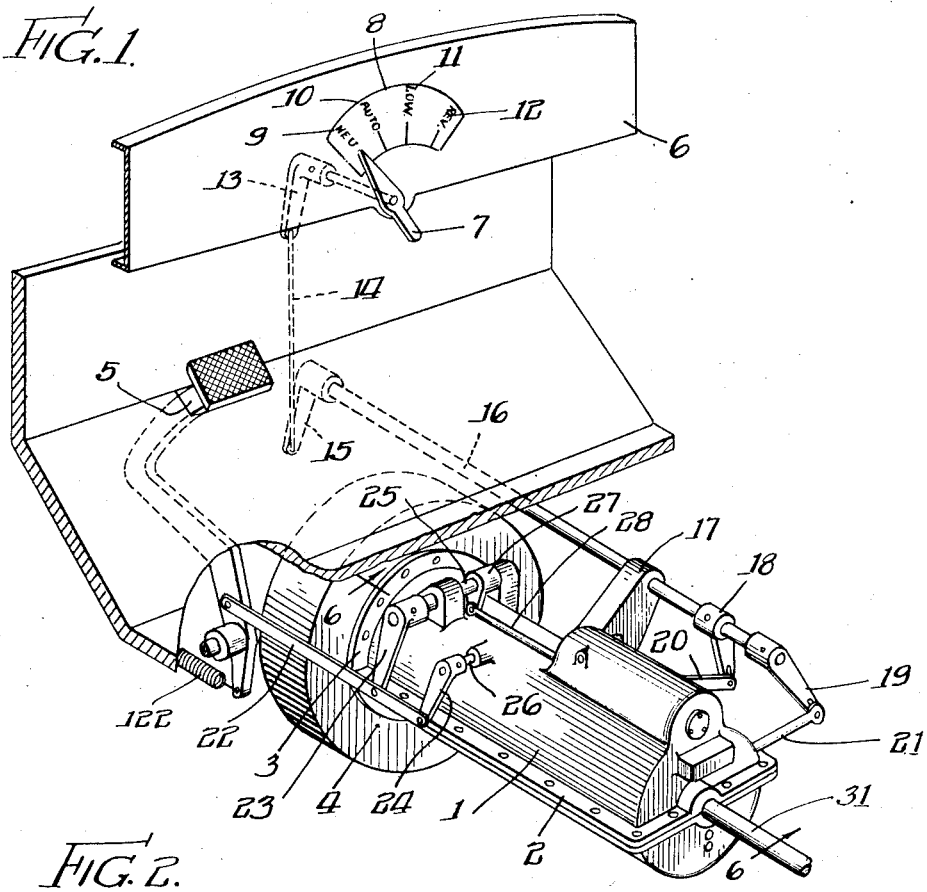
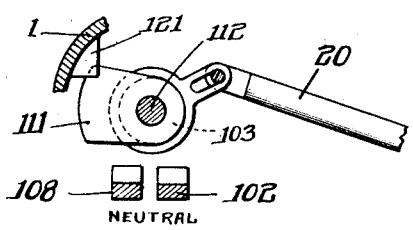
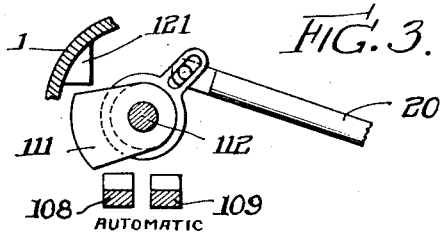
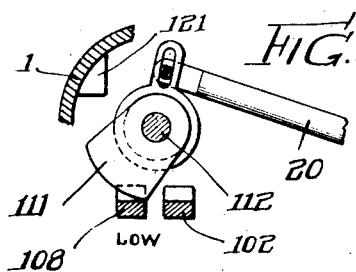
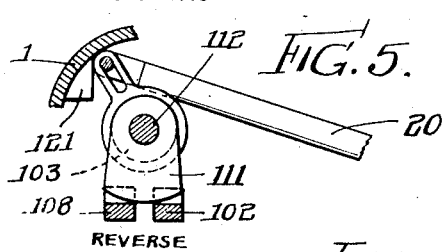
Inventor
Edward E. Giesen
By Arthur F. Durand
atty.

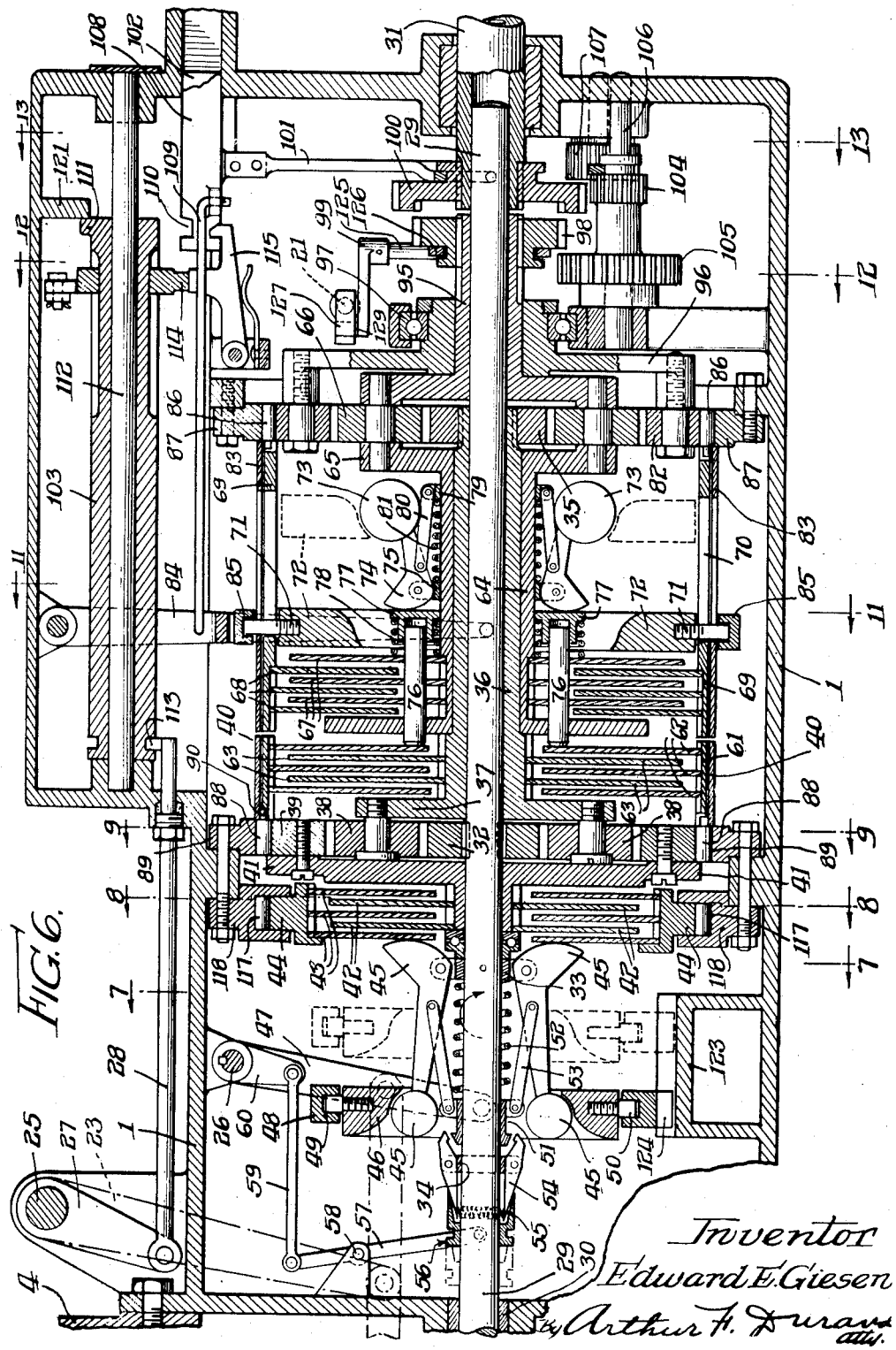

Nov. 26, 1940.   E. E. GIESEN   2,222,766
AUTOMATIC CHANGE SPEED TRANSMISSION
Filed April 27, 1938   4 Sheets-Sheet 3
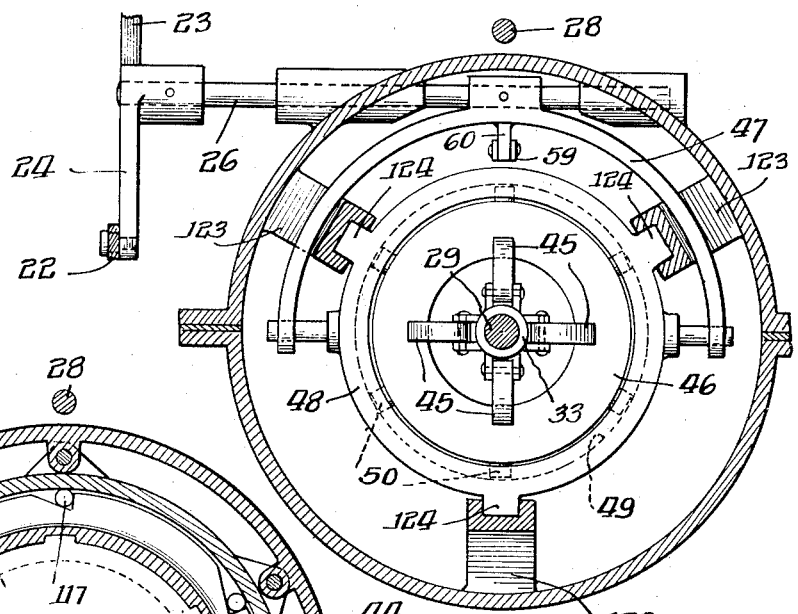
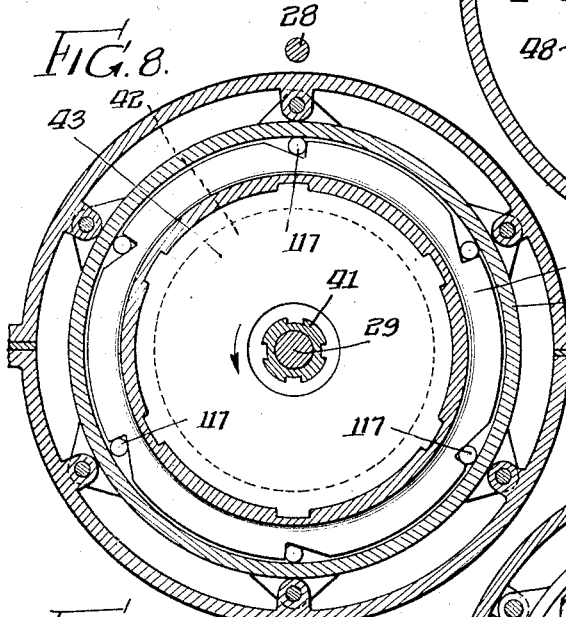
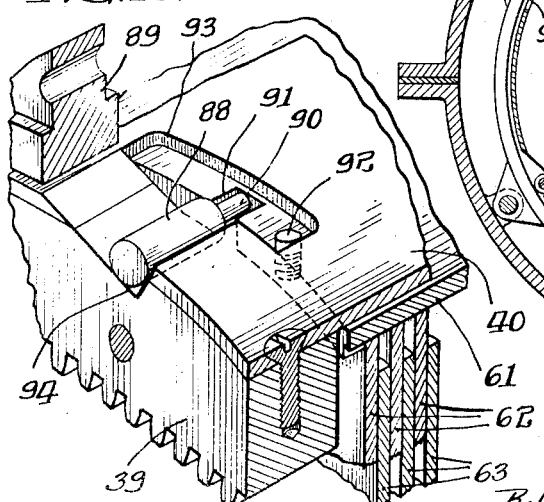
Inventor
Edward E. Giesen
By Arthur F. Durand
atty.

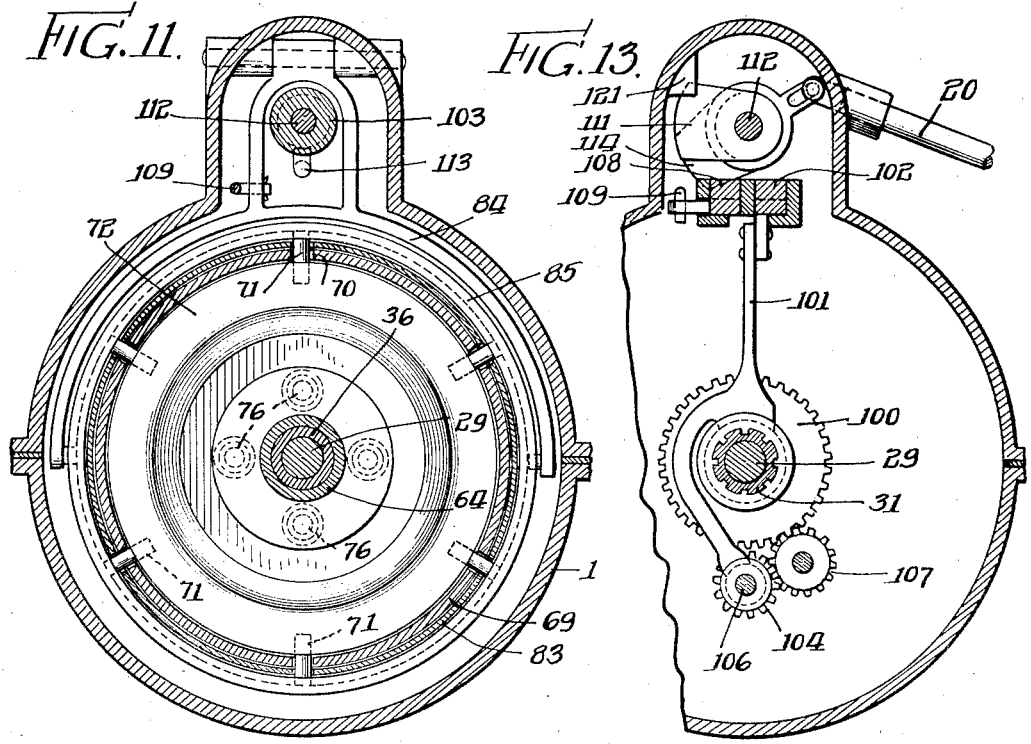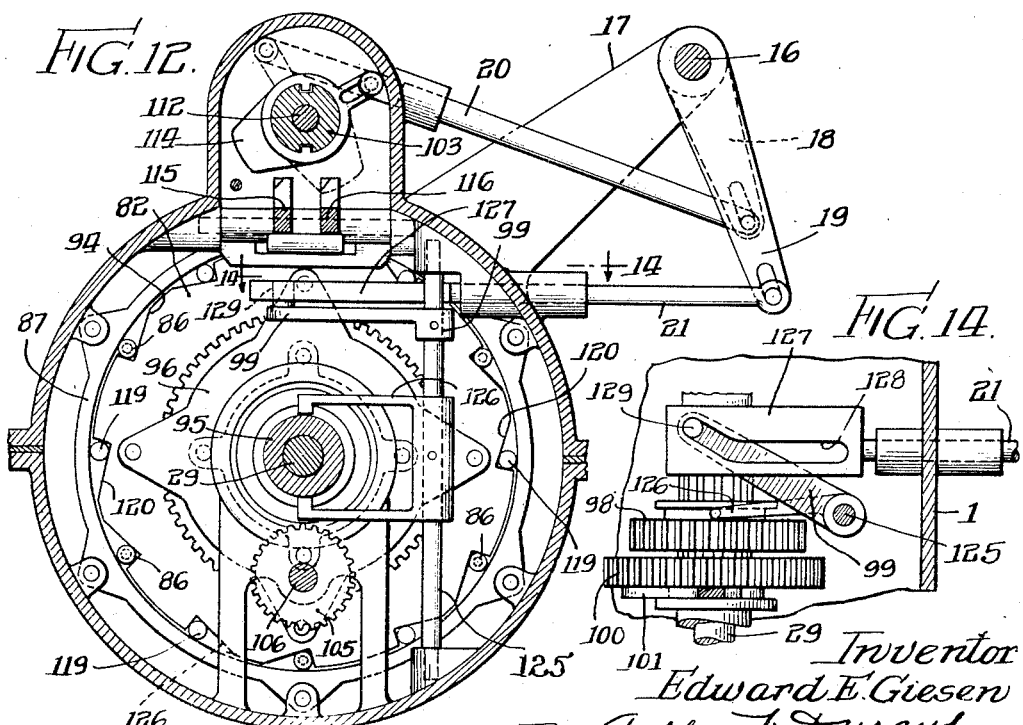

Patented Nov. 26, 1940

2,222,766

UNITED STATES PATENT OFFICE 2,222,766

AUTOMATIC CHANGE SPEED TRANSMISSION

Edward E. Giesen, Chicago, Ill.

Application April 27, 1938, Serial No. 204,517

25 Claims. (Cl. 74—260)

This invention relates to change speed gearing, for motor vehicles or for use in other situations where the load is variable, of the kind shown and described in prior application Serial No. 29,087, filed June 29, 1935, and covers some improvements thereon.

Generally stated, the object of this invention is to provide an improved construction and arrangement whereby certain advantages are obtained that are not possible with gearing previously employed for this purpose, including the gearing in said prior application.

In addition, another object is to provide an improved construction and arrangement whereby a gearing of this kind is adapted to insure a smoother and better starting action, a stronger and more substantial construction, as well as to utilize the braking power of the motor.

Another object is to provide an improved construction and arrangement whereby the controls for manually controlling the gearing are simplified and rendered more satisfactory in use.

A further object is to provide an improved construction and arrangement whereby the reversal of power, to reverse the motor vehicle, is more satisfactory than heretofore, in connection with change speed transmission gearing of this type.

It is also an object to provide certain details and features of construction and combinations tending to increase the general efficiency and desirability of change speed gearing of this particular character.

To the foregoing and other useful ends, the invention consists in matters hereinafter set forth and claimed, and shown in the accompanying drawings in which—

Fig. 1 is a perspective of a change speed gearing, and the controls therefor, embodying the principles of the invention.

Figs. 2, 3, 4, and 5 are detail or fragmentary views, more or less diagrammatic in character, illustrating the action of certain portions of said controlling means.

Fig. 6 is an enlarged longitudinal and axial section of the said gearing and its housing.

Fig. 7 is a transverse section on line 7—7 in Fig. 6 of the drawings.

Fig. 8 is a transverse section on line 8—8 in Fig. 6 of the drawings.

Fig. 9 is a transverse section on line 9—9 in Fig. 6 of the drawings.

Fig. 10 is a detail fragmentary view on a larger scale, in perspective, of certain portions of the gearing.

Fig. 11 is a transverse section on line 11—11 in Fig. 6 of the drawings.

Fig. 12 is a transverse section on line 12—12 in Fig. 6 of the drawings.

Fig. 13 is a transverse section on line 13—13 in Fig. 6 of the drawings.

Fig. 14 is a fragmentary plan view of a portion of said gearing, showing certain parts thereof, taken on line 14—14 in Fig. 12 of the drawings.

As thus illustrated, referring to Fig. 1, the invention comprises a cylindrical casing 1 composed of upper and lower sections with flanges 2 that are bolted together, this casing containing the automatic change speed gearing, and having its forward end provided with a flange 3 that is bolted to the usual fly wheel casing 4 of the motor vehicle. For controlling said gearing there is a clutch pedal 5, not for the usual clutch, but for a clutch mechanism in the said casing 1, that forms a portion of the transmission within said casing. Also, on the usual dash 6 of the vehicle, there is a hand controller 7 below a dial 8, on which latter are the four positions 9, 10, 11, and 12, representing, in the order stated, a neutral position for the gearing, an automatic position therefor, a low position for the same, and finally a reverse position for the gearing, this indicator being movable by hand to any one of said positions to thereby obtain any one of the four mechanical results specified. This indicator 7 is connected by a crank arm 13 and a rod 14 with a crank arm 15 on the longitudinal rock shaft 16, which latter is mounted in a bearing 17 on the side of the gear casing 1 previously mentioned, and provided at its rear end with crank arms 18 and 19 connected respectively by rods 20 and 21 with the gearing in the interior of said casing. It will also be seen that the clutch pedal 5 is connected by a rod 22 with the crank arms 23 and 24, respectively, mounted on the rock shafts 25 and 26, these rock shafts being mounted in bearings on the casing 1, in the manner shown, for the purpose of controlling the gearing inside thereof, in a manner that will hereinafter be more fully explained. In addition, it will be seen that a crank arm 27 is mounted on the rock shaft 25, and connected by a rod 28 with parts inside of the said casing, as will hereinafter more fully appear.

Inside of said casing 1, extending axially thereof, as shown in Fig. 6 of the drawings, is the input shaft 29 that is supported in the bearing 30 that is rigid with the said casing 1, at the input end of the latter, and at the other or output end of the casing said input shaft is supported within the hollow end portion of the output shaft 31, which latter may be connected through ordinary differential gearing to the rear axle of the motor vehicle. There is only one gear wheel keyed to this input shaft, which is the sun gear 32, but there are two collars 33 and 34 that are fixed on this shaft, for purposes which will hereinafter more fully appear. The other sun gear 35 is keyed to the adjacent end portions of the sleeve 36, which latter is rigid with the planet carrier 37, the latter having the planets 38 thereon, that engage the sun gear 32, and that also engage the rotary ring gear 39, which latter is rigid with the outer cylindrical rotary shell section 40, and this ring is also rigid with the member 41 to which the friction clutch disks 42 are secured, the other disks 43 of this clutch being secured to the ring member 44 as shown. This clutch is operated by the weighted arms 45 that are pivoted on the collar 33 previously mentioned, when the said arms are free to move away from each other by centrifugal force, but at certain times, say for the neutral position of the gearing, these arms are held in the position shown by the ring 46 that is movable axially of the transmission by the arm 47 on the previously mentioned shaft 26, this double arm 47 having its lower ends pivoted on the ring 48, which has an inner circumferential groove 49 in which the projections 50 on the ring 46 revolve or travel when the ring 46 is rotating by reason of its engagement with the said weighted arms 45, it being observed that the arm 47 is mounted on the rock shaft 26 previously mentioned. A collar 51 is loosely mounted on the input shaft, and a spring 52 is interposed between this collar and the collar 33 previously mentioned. Links 53 connect the collar 51 with the arms 45, and in this way the spring 52 serves to open the clutch when such is desirable. In addition, there is a safety automatic neutral lock and release device, comprising the catch arms 54 that are formed to hook over the adjacent end portions of the sleeve 51, and that are pivoted on the collar 34 previously mentioned, when the tail ends of these arms are forced away from each other by their springs 55, which prevents the closing of said clutch, at certain times, as will hereinafter more fully appear. To prevent these arms 54 from holding the sleeve 51 against movement to the right, by the centrifugal action of the arms 45 when the ring 46 is in the dotted position thereof, as shown in Fig. 6 of the drawings, there is a loose sleeve 56 on the input shaft adapted to slide over the tail ends of the arms 54, which sleeve is operated by an arm 57 pivoted at 58 on the casing and having its upper end connected by a rod 59 with the arms 60 on the rock shaft 26 previously mentioned.

The inner drum shell section 61 has the friction clutch disks 62 connected thereto, and the intermediate clutch disks 63 are connected with the said planet carrier 37 previously mentioned. A sleeve 64 is mounted on the sleeve 36 and its right hand end portion 65 forms a planet carrier for the planets 66 that engage the sun gear 35 previously mentioned. In addition, clutch plates or disks 67 are fixed on this sleeve 64, and the intermediate disks 68 which are connected with the inner drum section 69, the latter having longitudinal slots 70 therein for the pins 71 that carry the ring 72 that periodically engages the centrifugal weights 73 of the arms 74 that are in turn pivoted on a collar 75 on the sleeve 64 previously mentioned. Pins 76 extend through these clutch plates 67 and 68 to operate the clutch plates 62 and 63, and the arms 74 contact engaging disks 77 that slide on these pins, and that press the springs 78 against the clutch 67 and 68, whereby when the weights 73 move away from each other the springs 78 first close the clutch plates 67 and 68, and then the pins 76 close the clutch plates 62 and 63, so that the two clutches are closed successively by the centrifugal action. A collar 79 has links 80 pivoted thereon, the other ends of said links being pivoted on the arms 74 previously mentioned, and a spring 81 is interposed between the collars 75 and 79, so that this spring tends to open the disk clutches when the rotation stops, or when the speed is reduced. An internally toothed ring gear 82 engages the planets 66, this ring gear being rigid with the outer drum section 83, which latter is also slotted for the pins 71 previously mentioned. The ring 72 is moved axially by a bifurcated arm 84 that has suitable pivotal engagement with the ring 85, which latter is grooved circumferentially inside for the outer ends of the pins 71, inasmuch as the latter revolve while the ring 85 remains stationary. Rollers 86 are interposed between the ring gear 82 and the stationary ring 87, which latter is suitably bolted to the outer casing 1 in the manner shown. Similar rollers 88 are interposed between the ring gear 39 and the stationary ring 89, in notches formed in each ring gear, as shown more clearly in Fig. 10 of the drawings. As here shown, each roller 88, for example, has a reduced end portion 90 that is normally in a notch 91 in the drum section 61 previously mentioned. A pin 92 is fixed in the drum section 61, adjacent each roller, and the outer section 40 has a slot 93 for each pin thus provided. It will be seen that the rollers 88 are located in notches 94 formed in the ring gear 39, with the rear side of each notch forming a bevel up which the rollers can move to grip the inner periphery of the stationary ring 89 previously described. At certain times, as will hereinafter more fully appear, the inner section 61 will start to rotate in a clockwise direction, while the roller brake between the elements 39 and 89 is closed, so to speak, and this relative motion will throw the rollers out of gripping position, or out of gripping engagement with the inner periphery of the ring 89, through the medium of their reduced end portions 90, and such relative motion will continue until the studs 92 engage the ends of the slots 93, and then the two sections 40 and 61 will rotate in unison, and this roller brake action takes place in connection with the rollers 86, in the same manner, at certain times. Another planet carrier for the planets 66 is formed by the sleeve member 95, and the ring gear 82 is firmly bolted to the member 96 which forms a collar on said sleeve, the latter directly engaging the input shaft. This member 96 is supported by the roller bearing 97, in the manner shown more clearly in Fig. 6 of the drawings.

It follows, therefore, that there is at times relative rotation between the sections 61 and 69 of the drum cylinder or shell, as well as between the sections 40 and 83, and in addition there is some relative rotation between the outer and inner shell or cylinder sections, at times, as will hereinafter more fully appear.

The reversing gear comprises a gear 98 splined on the sleeve 95 and operated back and forth by the pivoted arm 99, which latter is connected to the rod 21 by a pin and slot connection shown in Fig. 14 of the drawings. The gear 100 is splined on the hollow end portion of the output shaft 31, and engaged by the fork or mover 101 that is carried by the endwise movable block 102 which is moved by the sleeve 103 when the arm 27 is swung one way or the other. The fork 101 also engages the collar of the pinion 104, which latter is rigid with the larger pinion 105, the two being sleeved on a stationary supporting rod or pin 106, in the manner shown. The pinion 104 engages the pinion 107 and, for reverse, gear 100 must engage pinion 107 and gear 98 must engage idler 105, but for straight ahead drive the gear 98 will engage the inner teeth of the gear 100, which amounts practically to a clutch connection, as the output shaft for the straight ahead drive will then receive power from the sleeve 95 previously mentioned.

Block 108 is at one side of block 102 and is connected by the rod 109 with the fork 84, to actuate the latter at the right time. The two blocks have upper notches 110 to receive the cam 111 on the endwise sliding sleeve 103, which latter is supported by the fixed rod 112, said sleeve being rotatable and having loose engagement at 113 with said rod 28, so that the latter actuates the sleeve endwise. A cam 114 is splined on the sleeve 103 and is operated when the rod 20 is actuated. The latches 115 and 116 engage notches in the under side of the blocks 108 and 102, to hold said blocks in normal position, and cam 114 will disengage the latches to unlock said blocks at predetermined times. In Fig. 2 the cam 111 is in engagement with the portion 121, and is not in engagement with either one of the latches 102 or 108. In Fig. 3 the cam 111 is out of engagement with the elements 121 and 122 and 108. Thus what is shown in Fig. 2 illustrates the condition of these parts for neutral, or what would be equivalent to neutral in the ordinary hand control transmission of a motor vehicle, while Fig. 3 illustrates the condition of these parts necessary for the automatic variable speed of the transmission shown and described. Again, in Fig. 4, the cam 111 is out of engagement with the portion 121, and is only in engagement with the latch 108, thus showing the condition of these parts for the low speed of the transmission. In Fig. 5 the cam 111 is in engagement with both latches 102 and 108, which is necessary for the reverse drive through the transmission, as in backing the motor vehicle.

Thus block 102 controls the reversing gear, while block 108 controls the said ring 72, for the described purpose, and both blocks are operative selectively by the endwise movement of the sleeve 103 from the arm 27 previously described, the selective action being produced by the rotation of the sleeve 103 to one position or the other, as indicated in Figs. 2, 3, 4, and 5 of the drawings. By setting the indicator 7 at any one of the four positions indicated on the dial 8, and by then using the pedal 5, the desired one of the four things obtained by the four positions of the cam 111 may be obtained. In Figs. 2 and 3, it will be seen that said cam 111 does not need to engage either of the blocks 102 and 108, but for the purpose of Fig. 4, said cam must engage only the block 108, while for the reverse, the cam must engage both blocks, as indicated in Fig. 5 of the drawings.

The brake rollers 117 are between the rotary ring 44 and the stationary ring 118, which latter is anchored to the stationary casing 1 previously described. The rollers 117 are like the rollers 86 and 88 except that they do not have the pins 90 and the slots 91 previously described.

As shown in Fig. 12, the ring gear 82 also has the rollers 119, the notches 120 of which slope in the opposite direction to the notches 94 previously described, so that this roller brake is operative to close in either direction, but the rollers 119 are not controllable by the drum, as rollers 119 do not have any pins 90 or notches 91, but like the rollers 117 are just plain rollers.

Briefly, the operation of the gearing and clutch mechanism is as follows:

When control pedal 5 is depressed, control ring 36 moves over the weights 45 to effect a neutral position at the same time the neutral lock 56 is released as shown.

For automatic drive, shaft 29 revolves to drive the first sun gear 32 which revolves the planets 38 in a circular path, owing to the ring gear 39 being held by the first overrunning brake 44 and 118 as shown. The action of weights 45 on clutch plates 42 holds the ring gear 39 stationary through the action of this overrunning brake. The drive is then from the planets 38, which latter drive the flanged sleeve 36 to drive the second sun gear 35, which latter drives the second set of planets 66 in a circular path, because the ring gear 82 at such time is held fixed by the third overrunning ring brake 87, as shown in the drawings. The planets 66 revolve to drive the sleeve 95, and in turn drive the gears 98 and 100 which are at such time acting as a jaw clutch.

For the automatic speed change, the second set of weights 73 then close the third disk clutch 67 and 68 to rotate the inner drum 69. It will be observed that the outer sleeve 64 is driven by rotation of the second set of planets 66 in a circular path, to drive the third set of clutch plates 67, causing the latter to drive the plates 68, thereby causing the rollers 86 and overrunning brake 87 (see Fig. 10) to move into unlocked position, thereby allowing the ring gear 82 to rotate with planets 66, which permits the latter and ring gear 82 to rotate as a unit, thereby to effect an intermediate speed. The drive is then through the first set of planets 38 and the sleeve 36 and sleeve 95, to drive directly to the output shaft 31, as shown in the drawings.

A further speed change is then brought about by the further movement of the second set of weights 73 to the left, causing the second clutch 62 and 63 to close and permit the overrunning brake 89 (similar to brake 87 shown in Fig. 10) to release ring gear 39, which allows the latter to revolve as a unit, as above described. The drive is now direct, practically from the input shaft to the output shaft, thereby effecting a high speed, or a third speed, inasmuch as the entire mechanism now revolves as a solid mass, but for low speed it will be seen that the transmission is through the gearing, from the input shaft to the output shaft, so that the latter will have a lower speed than the input shaft. But the outer drum 83 is rigid with ring gear 82, and supports the inner drum 69, and also takes the drive of clutch plates through the inner drum, and through the construction shown in Fig. 10 of the drawings.

In starting the car, therefore, the driver will first press the clutch pedal 5 a little, after starting the engine, and will then set the indicator 7 to the automatic position on the dial. After that, the operator or driver will release the pedal, and let the car go ahead automatically, with automatic speed changes from low gradually to high.

In slowing down, the operator will use the gas pedal or accelerator, in the ordinary manner. Then, to slow up, and to stop, the driver will release the gas pedal, and the clutch 42, 43 will open automatically, to keep the engine running. Should the engine die, or stop, then to start the car it will be necessary to start the engine with the gas pedal, and then depress and release pedal 5, as the indicator is still at the automatic position on the dial. For hill climbing, or slow traffic, the driver may put the indicator 7 at the low position on the dial, or it can remain at automatic and thereby shift automatically as described. For reversing the motor vehicle, the driver will first depress and hold pedal 5, and then put the said indicator at the reverse position on the dial, and use the gas pedal as explained.

The above mode of operation is made possible and practicable, preferably, by the provision of certain elements as follows: a lug 121, shown in Figs. 2 to 6, is provided in the upper portion of the housing 1 and is adapted to co-operate with the cam 111 on the sleeve 103, which is urged to the right as shown in Fig. 6 by the spring 122 acting through the linkage 22, 23 and 28. The purpose of this projection or lug 121 is to prevent movement of the sleeve 103 to the right when the mechanism is in a neutral position as shown in Figs. 1 and 6. It is held in this position until cam portion 111, which engages the lug 121, is actuated by the indicator 7 through the link connections 13, 14, 15, etc., to change to a different speed, at which time the cam 111 disengages from the lug 121, and the sleeve 103 is then free to move to the right to engage the block 108 and 102 by means of the cam 111.

Positioned in the forward portion of the housing 1, preferably, are three guiding brackets 123 (see Figs. 6 and 7) which are spaced about the inner periphery of the housing 1 and form a track or guideway for the lugs 124 which are spaced around the outer periphery of the ring 48, and being a part thereof. By this construction, the ring 48, as it is shifted from the dotted line position to the full line position as shown in Fig. 6, is supported and guided by the brackets 123.

Referring to the hereinbefore described gears 98 and 100 and their clutching engagement with each other to effect a forward drive, there is, preferably, a pivoted link 99 pinned to the vertical rod 125 (see Fig. 12) and which also has pinned thereto a fork or mover 126 which when actuated will shift the gear 98 into or out of engagement with the gear 100. This movement is accomplished by a cam block 127 having a slot 128 engaging a pin 129 on the arm 99. The initial movement of the block 127, when it is shifted from the neutral position to the automatic position by the operation of the indicator 7, causes the inclined portion of the slot 128 to cam the arm 99 in a counter clockwise direction as shown in Fig. 14, thereby shifting the gear 98 into clutching engagement with the gear 100. Further movement of the cam 127 to the left as indicated in Fig. 14 does not affect re-positioning of the gear 98 with respect to the gear 100. Upon returning again to a neutral position, the cam 128 will disengage gear 98 from gear 100 to break the driving connection.

By reason of the notches 91 in the drum section 61 and the pins 90 on the ends of the rollers 88, it is obvious that the disks 62 of this disk clutch have a certain control over these rollers, and it will be understood that the rollers 86 are similarly controlled by the disks 68 of the other disk clutch, through the medium of the drum section 69, as indicated in the drawings.

Thus the device in Fig. 10 serves to lock and unlock the ring gear 39, and functions in high to unlock or release this ring gear. As soon as the clutch 62—63 opens, the ring gear 39 is locked again, to utilize the braking power of the engine. Then, the safety neutral latch 34—54 locks in neutral position when the engine stops.

What I claim as my invention is:

1. In a change speed transmission, for use in driving a motor vehicle at different speeds, the combination of an input planetary gearing, the latter having a sun gear keyed to the primary input of power, an output planetary gearing axially aligned with the first-mentioned gearing, disk clutch mechanism disposed between the one gearing and the other gearing, axially aligned therewith, a rotary sleeve extending axially of said mechanism, with the planets of said input gearing mounted on one end of said sleeve, and the sun gear of the output gearing fixed on the other end of said sleeve, centrifugally operated means for automatically closing said clutch mechanism, disposed between the clutch mechanism and one gearing, so that said clutch mechanism is between said centrifugal means and the other gearing, instrumentalities co-operating with said gearing and clutch mechanism to provide different ratios of transmission, an axially movable rotary ring disposed between said clutch mechanism and said one gearing, adapted to be interposed to prevent the operation of said centrifugal means, and instrumentalities for manually shifting said ring, together with guiding means for said ring at the outer periphery thereof, rotatable in unison therewith, said sleeve having internal support.

2. A structure as specified in claim 1, said clutch mechanism comprising a plurality of axially aligned separate disk clutches, between said keyed sun gear and said centrifugal means.

3. A structure as specified in claim 1, comprising an axial input shaft forming said primary input, and an axial output shaft axially aligned with said gearing and clutch mechanism, the input shaft extending in one rigid section through both gearings and said sleeve and having none of the disks of said automatic clutch mechanism fixed thereon.

4. A structure as specified in claim 1, comprising a rotary drum structure enclosing said clutch mechanism, supporting said axially movable ring and some of the disks of said clutch mechanism, and forming said guiding means for the axial motion of the ring, each gearing having an internal tooth gear ring rigid with said drum, the latter receiving rotation from said keyed sun gear.

5. A structure as specified in claim 1, comprising another disk clutch mechanism at the input end of said automatic change speed transmission, with none of the disks thereof rigid with said input shaft, and centrifugally operated means for closing this second clutch mechanism, the latter being disposed between said last mentioned centrifugal means and said first mentioned clutch, together with another axially movable ring for engaging and preventing the operation of said last-mentioned centrifugal means.

6. A structure as specified in claim 1, said clutch mechanism comprising two separate clutches controlled successively by said centrifugal means, and disposed between the latter and said keyed sun gear.

7. A structure as specified in claim 1, comprising another disk clutch mechanism at the input end of said transmission, with said keyed sun gear between the one mechanism and the other, and centrifugally operated means for closing this second clutch mechanism, the latter being disposed between said last mentioned centrifugal means and said first mentioned clutch.

8. A structure as specified in claim 1, there being rotary means receiving rotation from said keyed sun gear said rotary means enclosing said centrifugal means and having longitudinal slots forming said guiding means through which said movable ring is controlled.

9. A structure as specified in claim 1, comprising means forming two axially aligned drum sections, forming one drum as a whole, said mechanism being operative to lock said drum to said sleeve, said drum having a removable head at each end thereof, with said clutch mechanism and ring disposed between the heads of said drum sections, and with each gearing incorporated in one of said heads.

10. A structure as specified in claim 1, comprising a rotary drum enclosing said clutch mechanism, said drum having a removable head at each end thereof, with each gearing incorporated in one of said heads, said mechanism being operative to lock said drum to said sleeve.

11. A structure as specified in claim 1, comprising a rotary drum axially aligned with and enclosing said clutch mechanism and ring, said mechanism being operative to lock said drum to said sleeve, with internal tooth gear rings on the opposite ends of said drum, forming part of said gearing.

12. A structure as specified in claim 1, said centrifugal means comprising weights disposed between the two sets of gears and movable about axes disposed at right angles to the axis of said clutch mechanism and gearing, which axes are between the weights and the input set of gears, comprising a larger sleeve on said first-mentioned sleeve, supporting said centrifugal means.

13. A structure as specified in claim 1, comprising a disk clutch outside of said input gearing, with centrifugal means for operating this outside clutch, and a safety automatic neutral lock and release device for controlling said last mentioned centrifugal means.

14. A structure as specified in claim 1, comprising a disk clutch outside of said input gearing, the latter having a ring gear connected to rotate with some of the disks of said outside clutch, together with means for controlling said outside clutch.

15. A structure as specified in claim 1, comprising a disk clutch outside of said input gearing, the latter having a ring gear connected to rotate with some of the disks of said outside clutch, together with means for controlling said outside clutch, and some of the disks of said mechanism being mounted to rotate only in unison with said ring gear.

16. A structure as specified in claim 1, having a reversing gear at the output end of said transmission, said output gearing having a planet carrier sleeve projecting into said reversing gear.

17. A structure as specified in claim 1, comprising a catch for holding the said axially movable ring in its inoperative position.

18. A structure as specified in claim 1, comprising a pair of endwise movable blocks, a reversing gear, means connecting one block to said ring, means connecting the other block to said reversing gear, manually controlled means for selecting the ring block, for driving ahead, adapted to engage both blocks for reversing, and manually operated means for causing actuation of said blocks in either of said selections thereof.

19. A structure as specified in claim 1, comprising a pair of endwise movable blocks, a reversing gear, means connecting one block to said ring, means connecting the other block to said reversing gear, manually controlled means for selecting the ring block, for driving ahead, adapted to engage both blocks for reversing, and manually operated means for causing actuation of said blocks in either of said selections thereof, together with a latch normally holding said blocks against endwise movement, which latch is operated by said selecting means to unlatch the block.

20. A structure as specified in claim 1, comprising a pair of endwise movable blocks, a reversing gear, means connecting one block to said ring, means connecting the other block to said reversing gear, manually controlled means for selecting the ring block, for driving ahead, adapted to engage both blocks for reversing, and manually operated means for causing actuation of said blocks in either of said selections thereof, said selecting means comprising an axially rotary sleeve having a cam for selectively engaging said blocks.

21. A structure as specified in claim 1, comprising another disk clutch mechanism at the input end of said automatic change speed transmission, with none of the disks thereof rigid with said input shaft, and centrifugally operated means for closing this second clutch mechanism, the latter being disposed between said last mentioned centrifugal means and said first mentioned clutch, together with another axially movable ring for engaging and preventing the operation of said last-mentioned centrifugal means, and a roller clutch device disposed between said first mentioned disk clutch mechanism and said last mentioned disk clutch mechanism, having clutch rollers movable in one direction to close this clutch, and movable in the opposite direction to open the same, said rollers being under the control of some of the disks of said first mentioned disk clutch mechanism, as and for the purpose set forth.

22. A structure as specified in claim 1, comprising a roller brake device having rollers controlled by some of the disks of said disk clutch mechanism, and another roller brake device farther toward the output end of the transmission structure, as and for the purpose set forth.

23. A structure as specified in claim 1, comprising roller brake means operative automatically to produce a locking action between certain elements of the transmission to utilize the braking power of the engine.

24. In a change speed transmission, for use in driving a motor vehicle at different speeds, the combination of planetary gearing and disk clutch means for providing an automatic variable ratio of speed between the input and output of the transmission, having pivoted centrifugally operated elements, with an adjustable ring for preventing centrifugal action thereof, an annular element having link connection with said centrifugal means, one or more dogs for engaging said annular element, to hold the latter in position to prevent action of said centrifugal means, a member for engaging said dog or dogs to thereby release said annular element, a spring normally holding said annular element in normal position, and means for manually controlling said member to unlock said centrifugal means.

25. In a change speed transmission, for use in driving a motor vehicle at different speeds, the combination of a planetary gearing, another planetary gearing axially aligned with the first-mentioned gearing, roller clutch means associated with said first-mentioned planetary gearing, and adapted automatically to produce action between certain elements of the transmission to utilize the braking power of the engine, disk clutch mechanism disposed between the one gearing and the other gearing, axially aligned therewith, centrifugally operated means for automatically closing said clutch mechanism, disposed between the clutch mechanism and one gearing, so that said clutch mechanism is between said centrifugal means and the other gearing, instrumentalities co-operating with said gearing and clutch mechanism to provide different ratios of transmission, an axially movable rotary ring disposed between said clutch mechanism and said one gearing, adapted to be interposed to prevent the operation of said centrifugal means, and instrumentalities for manually shifting said ring, together with guiding means for said ring at the outer periphery thereof, rotatable in unison therewith.

EDWARD E. GIESEN.